No. 666,635.　　　　　　　　　　　　　　Patented Jan. 22, 1901.
J. E. NORMAND.
OPERATING VALVE FOR BRAKE MECHANISMS.
(Application filed Mar. 26, 1900.)

(No Model.)　　　　　　　　　　　　　　3 Sheets—Sheet 1.

WITNESSES:　　　　　　　　　　　　　　INVENTOR
D. H. Hayward　　　　　　　　　　　　　Joseph E. Normand
C. F. Carrington　　　　　　　　　　　　BY
　　　　　　　　　　　　　　　　　　　　J. C. Chapin,
　　　　　　　　　　　　　　　　　　　　His ATTORNEY No. 666,635. Patented Jan. 22, 1901.
J. E. NORMAND.
OPERATING VALVE FOR BRAKE MECHANISMS.
(Application filed Mar. 26, 1900.)
(No Model.) 3 Sheets—Sheet 2.
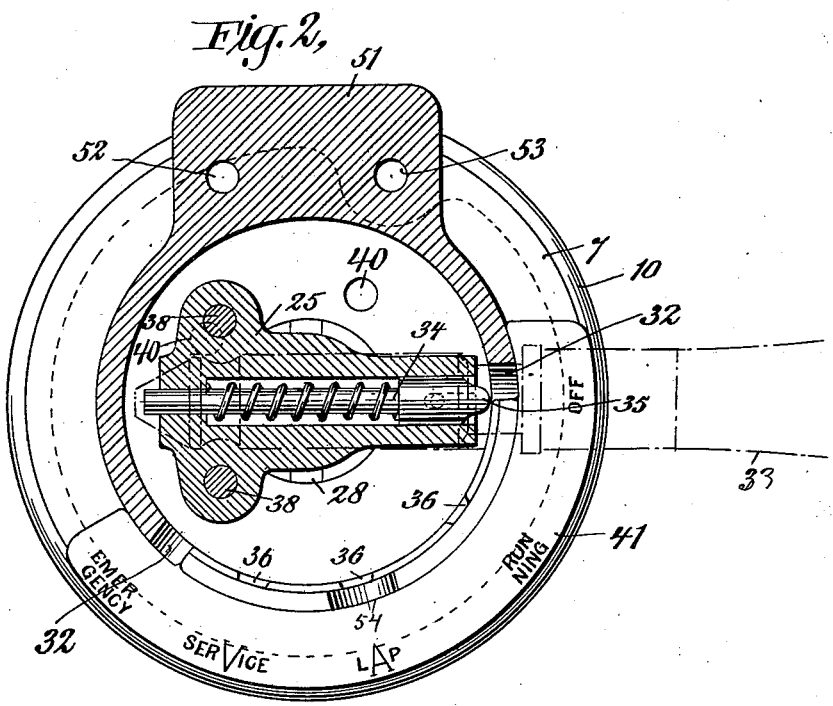
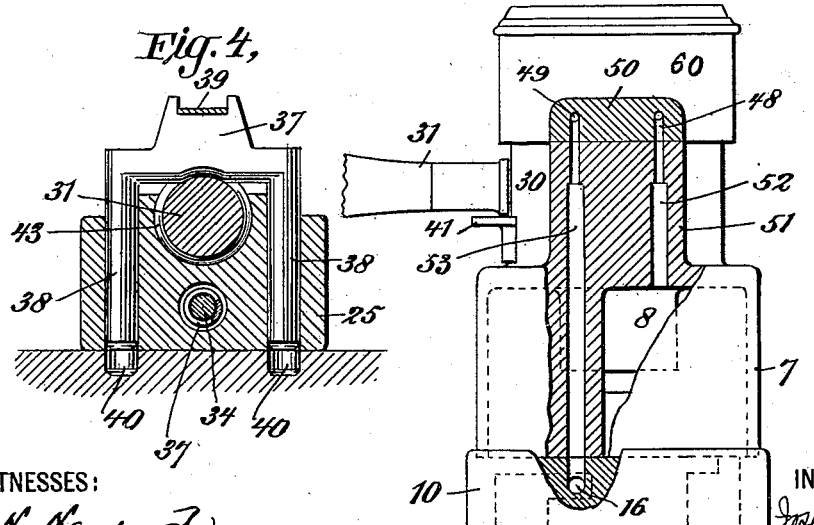
WITNESSES:
D. N. Naywood
C. F. Carrington
INVENTOR
Joseph E. Normand
BY J. E. Chapin
His ATTORNEY No. 666,635. Patented Jan. 22, 1901.
J. E. NORMAND.
OPERATING VALVE FOR BRAKE MECHANISMS.
(Application filed Mar. 26, 1900.)

(No Model.) 3 Sheets—Sheet 3.

WITNESSES:
O. K. Hayward
C. F. Carrington.

INVENTOR
Joseph E. Normand
BY
J. E. Chapin
His ATTORNEY

THE NORRIS PETERS CO., PHOTO-LITHO., WASHINGTON, D. C.

UNITED STATES PATENT OFFICE.

JOSEPH E. NORMAND, OF WATERTOWN, NEW YORK.

OPERATING-VALVE FOR BRAKE MECHANISMS.

SPECIFICATION forming part of Letters Patent No. 666,635, dated January 22, 1901.

Application filed March 26, 1900. Serial No. 10,148. (No model.)

*To all whom it may concern:*

Be it known that I, JOSEPH E. NORMAND, a citizen of the United States of America, and a resident of Watertown, county of Jefferson, State of New York, have invented certain new and useful Improvements in Operating-Valves for Brake Mechanisms, of which the following is a specification.

My invention relates to operating-valves, and relates particularly to operating-valves for use in connection with air-brake apparatus.

My invention consists generally in improvements in the construction of such valves and in certain novel features of construction and combination of parts to be hereinafter more fully set forth.

I will now proceed to describe an operating-valve embodying my invention, and will then point out the novel features in claims.

Figure 1:
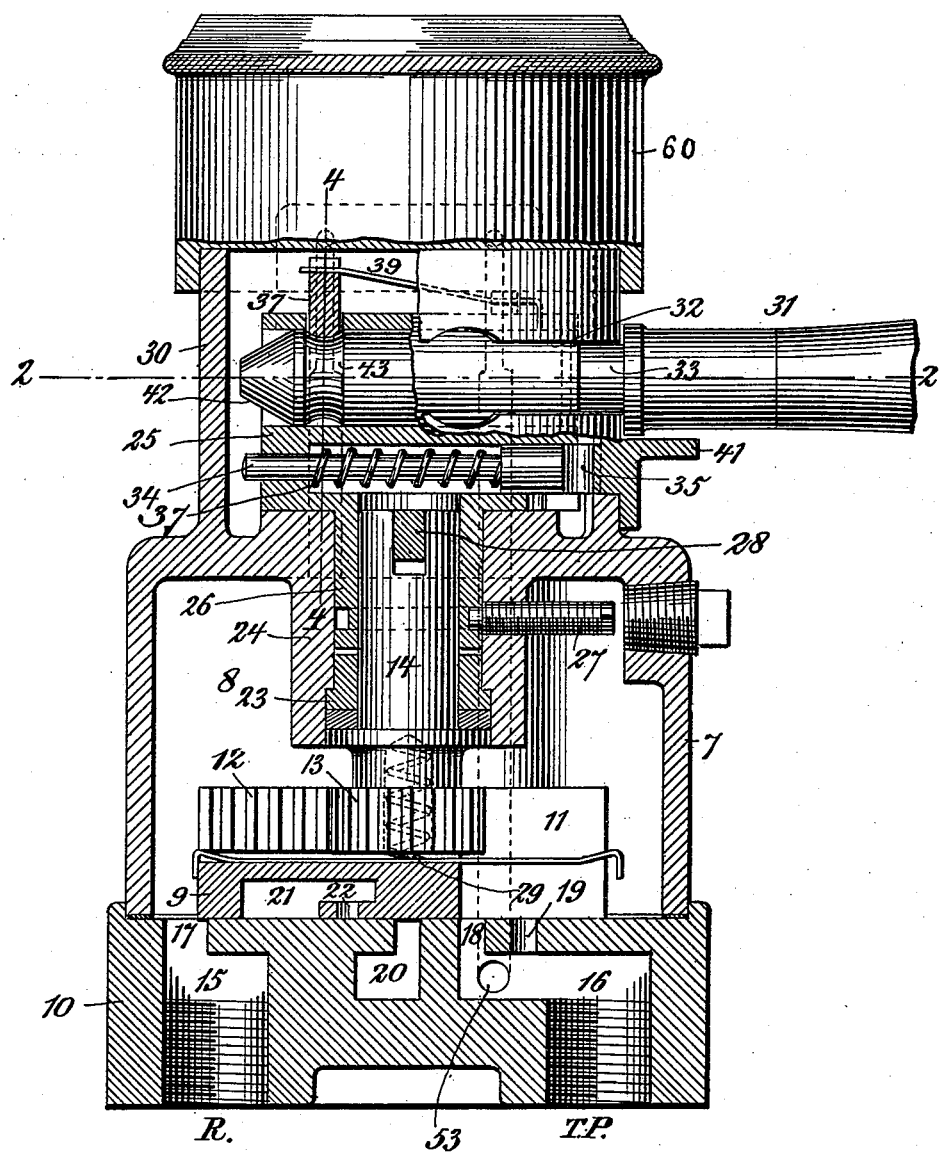
Figure 5:
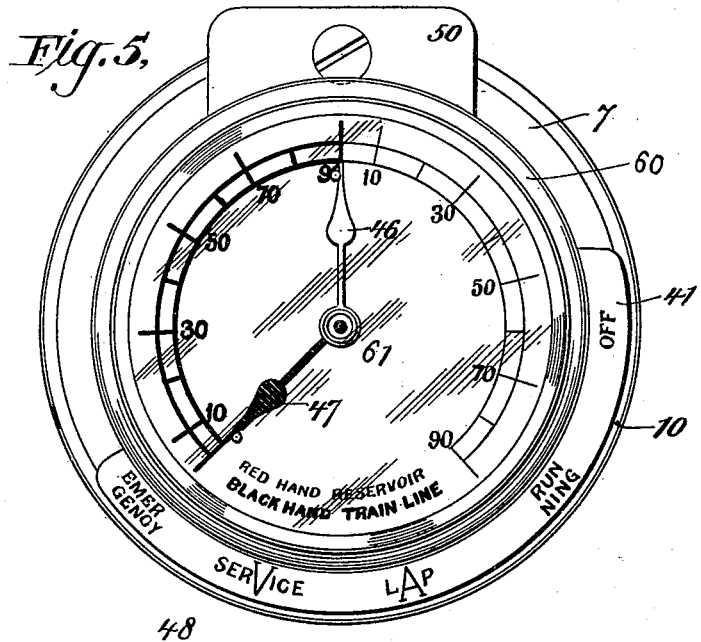
Figure 6:
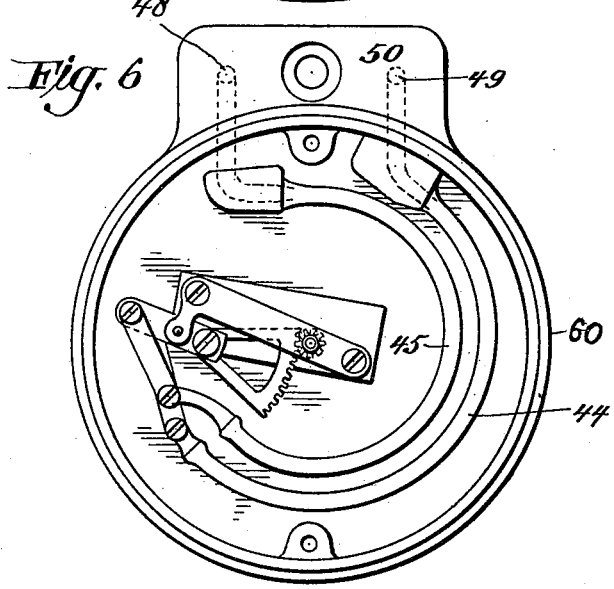

In the drawings, Figure 1 is a central vertical section of an operating-valve embodying my invention, certain parts being shown in side elevation. Fig. 2 is a horizontal section of the same, taken on the plane of the line 2 2 of Fig. 1. Fig. 3 is a side elevation of the same, taken from the opposite side of view to which Fig. 1 is taken, certain parts being broken away in order to show two air-ports. Fig. 4 is a detail vertical section taken on the plane of the line 4 4 of Fig. 1. Fig. 5 is a view looking down on the top of the valve, showing the face of the pressure-indicator. Fig. 6 is a detail face view of the pressure-indicator with the dial and pointers removed.

Similar reference characters designate corresponding parts in all of the figures.

Reference character 7 designates a suitable casing inclosing a valve-chamber 8. 9 designates a slide-valve suitably mounted in said valve-chamber and adapted to slide on the valve-seat provided in the base 10. The base 10 is suitably secured to the casing 7. The valve 9 is guided by two cheek-pieces 11, one of which is shown in Fig. 1. A toothed rack 12 is formed as a part of or secured to the said valve, and a pinion 13, mounted upon an operating-rod 14, engages with the said toothed rack. A partial rotation of the operating-rod 14 will impart a reciprocating motion to the valve 9.

Provision is made in the base 10 for a connection to a source of compressed-air supply at 15, and provision for connection with the train-pipe of an air-brake system at 16. From the connection 15 a port 17 leads to the interior of the chamber 8 and is open thereto at all times. From the connection 16 an emergency-port 18 leads to the interior of said chamber, as also a smaller service-port 19.

20 designates an exhaust-port provided in the base 10. The valve 9 has an exhaust-cavity 21 and a small exhaust-port 22 leading thereto. In the position in which the parts are shown in Fig. 1 the train-pipe is full open to the reservoir or source of compressed-air supply. This is the first or "off" position of the valve and the position to which the valve is turned when the brakes are thrown off and the train-pipe is being recharged. In the second or "running" position the smaller port 19 is opened to the interior of the chamber 8, and hence to the reservoir. In the third or "lap" position the valve 9 closes both the ports 18 and 19, and hence everything is shut off. In the fourth or service-stop position the small port 22 in the valve 9 is brought opposite the port 18, while the exhaust-cavity 21 connects with the exhaust-port 20. In this position air from the train-pipe is slowly discharged and a service-stop is the result. In the emergency position, which is the fifth or final position, the exhaust-cavity 21 in the valve 9 connects the large train-pipe port with the exhaust-port 20, and a rapid discharge of the air in the train-pipe causes an emergency setting of the brakes.

The operating-rod 14 is suitably mounted in a packing-bushing 23, in turn mounted in a depending boss 24 of the casing 7. The operating-rod 14 is secured to rotate with an operating-head 25, the operating-head being rotatively mounted in the casing 7. A cylindrical hub 26 projects downwardly from the operating-head 25 and is fitted to the upper end of the depending boss 24, and a pin 27, having a threaded engagement with the said depending boss, projects into a circumferential groove in the cylindrical projection 26 and retains the operating-head 25 in place. The end of the operating-rod 14 is received within the cylindrical projection 26, and a key 28 passes through a keyway in the said projection and fits easily in an open slot in the end of the operating-rod 14. In this manner the operating-rod 14 and the operating-head 25 are secured to rotate together, but the operating-rod 14 is free to be withdrawn through the chamber 8 when desired, and upon removal of the pin 27 the operating-head 25 is free to be removed. Further, while the operating-head 25 is kept down to its seat at all times the rod 14 has a limited movement up and down to compensate for wear in the packing or the surfaces bearing thereon. The passage of air in the chamber 8 normally tends to hold the operating-rod 14 up to its seat, and a light spring, as 29, may be provided to so hold the operating-rod when there is no air-pressure in the chamber 8. The casing 7 has an upwardly-projecting cylindrical flange 30, and it is within this flange that the operating-head 25 is arranged.

An operating-lever 31 is mounted in the head 25, and a circular movement in a horizontal plane about the axis of the operating-head 25 is permitted the lever 31 by reason of the slot 32 in the flange 30, in which a reduced portion 33 of the shank of the lever 31 has play. The length of the slot may be so arranged as to correctly limit the movement of the lever, so as to permit a movement of the valve from its No. 1 to its No. 5 position.

An impositive lock is provided between the head 25 and the casing 7 in order to correctly and readily locate the valve in its various intermediate positions, such as the running, surface, and lap positions. The action of this impositive lock is best understood by reference to Figs. 1 and 2. A spring-pin 34 is mounted in the operating-head 25, the said pin having a head 35, adapted to engage with a series of notches 36, which are arranged opposite the various said intermediate positions. A spring 37 tends to force the head of the pin 34 into the notches 36. The engagement of the pin 34 with the notches 36 will be such as to readily locate the various positions of the valve, while at the same time a little extra force applied to the operating-lever 31 will release the pin from such engagement and permit a movement of the head.

A positive lock is provided in the yoke 37, which carries two locking-pins 38, mounted and guided in the operating-head 25. A spring 39, secured at one end to the said operating-head, engages at the other end with the yoke 37 and tends to force the locking-pins 38 downwardly. The locking-pins 38 are, however, normally held in their upper position by the engagement of the yoke 37 with the operating-lever 31 at or near the end thereof. Two locking-recesses 40 are provided in the casing 7, with which the pins 38 will engage. These locking-recesses 40 are so arranged that when the operating-head 25 has been turned so as to bring the valve into its lap position the locking-pins 38 will be opposite thereto and ready to engage therewith upon the release of the yoke 37 from the handle or lever 31. The slot 32 opposite this lap position is enlarged, as shown at 54, and when the lever is opposite this slot, and hence the valve in its lap position, the operating lever or handle 31 may be withdrawn from its engagement with the locking-head 25. The enlargement of the slot is sufficient to permit of this withdrawal. Upon the withdrawal of the lever 31 the locking-pins 38 will immediately engage with the locking-recesses 40 and the head 25 will be locked in position. By this it will be seen that the operating-handle can only be removed when the valve is in this lap position, and when so removed the parts will be positively locked from any further movement until the operating-lever is again inserted. For convenience of manufacture I have made the segment 41, in which the notches 36 are cut, and which segment may also be suitably engraved on its upper side to indicate the various positions in which the valve may be set, apart separate from the casing 7, but secured thereto. It may of course, if desired, be made integral therewith.

For the purpose of the ready reëngagement of the operating-lever 31 I have constructed the end thereof with a conical head, as 42. Back of this head I have arranged a circumferential groove 43, which is adapted to engage the yoke 37 of the positive lock in any direction the handle may be turned. Further, the engagement of the yoke 37 with the groove 43 tends to hold the operating-lever in its position, so as to avoid undue friction between the shoulders formed by the contracted portion 42 and the edges of the slot 32 in the flange 30.

To make a more complete device and for a convenience to the operator, I have combined with my valve a duplex-pressure indicator. The duplex-pressure indicator is provided with two separate pressure-gage mechanisms and with two separate pointers for indicating the pressure in said pressure-gage mechanisms. 60 designates a casing therefor mounted upon the top of the flange 30 and suitably secured thereto. A dial 61 is arranged at the upper end end thereof, so that it may be readily seen by looking down upon the device. The dial is divided into two parts and has two separate scales arranged thereon.

Within the casing 60 (see Fig. 6) are arranged two pressure-gage mechanisms 44 and 45. One of these mechanisms operates a pointer 46, (see Fig. 5,) and the other operates a pointer 47. The pressure-gage mechanisms 44 and 45 lead to two air-ports 48 and 49, which are arranged in an extension 50 of the casing 60, which extension 50 engages with a similar extension 51 upon the casing 7. The ports 48 and 49 register with corresponding ports 52 and 53 in the said casing 7. The port 52 connects with the interior of the casing 7. Hence the pointer 46 will indicate upon the right-hand scale of the dial 61 the pressure of the reservoir or compressed-air supply.

The port 53 connects with the connection 16 to the train-pipe, and hence the pointer 47 will indicate upon the left-hand scale of the dial 61 the pressure in the train-pipe. These two scales in practice are printed on the dial in two colors—black for the dial indicating the pressure in the train-pipe and red for the dial indicating the pressure of the compressed-air supply. The pointers are also preferably of colors corresponding to the colors of the scales. The effect of this will be that the operator is enabled to tell at a glance either one of the pressures he is desirous of learning without being confused by the other one.

By the foregoing it will be seen that in my construction I have placed an operating-valve and pressure-indicator combined which is of an exceedingly compact form, which is composed of very few parts, and which will fulfil the requirements of such devices in a very effective manner. By reason of the impositive stop my valve may be readily and easily set in any desired position, and by reason of the feature of the removable handle and positive lock the said valve may be safely left without danger of the tampering therewith by irresponsible persons. In combining therewith the duplex-pressure indicator an operator is enabled while operating the valve to watch the conditions of both the compressed-air supply and the air-pipe. Further, in so combining the said indicator with the valve one device is made to serve a double purpose, and piping connections between them are abolished.

What I claim is—

1. In an operating-valve the combination with a suitable casing having a plurality of ports, and a valve adapted to assume various positions to open and close said ports, of an operating member for said valve, an impositive lock adapted to hold the said operating member in any of its various intermediate positions, a removable handle adapted to engage the said operating member and a positive lock adapted to lock the operating member against movement from a predetermined one of its positions upon the removal of the said handle.

2. In an operating-valve the combination with a suitable casing having a plurality of ports, and a reciprocating slide-valve adapted to assume various positions to open and close said ports, of a rotative operating member adapted in its movement to reciprocate the said valve, an impositive lock adapted to hold the said operating member in any of its various intermediate positions, a removable handle adapted to engage the said operating member and a positive lock adapted to lock the operating member against movement from a predetermined one of its positions upon the removal of the said handle.

3. In an operating-valve, the combination with a casing having a plurality of ports and a reciprocating slide-valve mounted therein and adapted to slide on a suitable seat, of a rotative operating-head, and a member intermediate of the said valve and the said operating-head, said member being rotatively secured to the said operating-head, and adapted in its movement to impart a reciprocating movement to the said valve, said member having a limited movement, longitudinally of its axis of rotation, between the said valve and the said operating-head.

4. In an operating-valve the combination with a casing having a plurality of ports, and a reciprocating slide-valve mounted therein and adapted to slide on a suitable seat, of a rotative operating-rod adapted in its movement to reciprocate the said valve, said rod mounted in the said casing, and removable therethrough, a rotative operating-head mounted in said casing and removable therefrom in an opposite direction to that in which the operating-rod is removable, and a loose connection between the said operating-head and the operating-rod whereby they are adapted to rotate together but are free to have a relative movement to each other, longitudinally of their axis of rotation.

5. In an operating-valve the combination of a casing having a plurality of ports, a reciprocating slide-valve mounted therein and adapted to slide on a suitable seat, said valve being provided with a toothed rack, a rotative operating-rod having a pinion engaging with the toothed rack of said valve, and an operating-head having a key-and-slot connection with said operating-rod whereby the said operating-head is adapted to impart rotary motion to said operating-rod, but that said operating-rod may have a movement longitudinally of its axis, independently of said operating-head.

6. In an operating-valve the combination with a casing having a plurality of ports, and a valve adapted to assume various positions to open and close said ports, of an operating member for said valve, a spring-pin mounted in said operating member and adapted to engage with notches in the said casing and to impositively hold the said operating-head in any of its various intermediate positions, a second locking-pin carried by the said operating-head, a removable handle adapted to engage the said operating-head, and normally to hold the said locking-pin in its unlocked position, and means whereby the handle may be disengaged from the said operating-head when the valve is in a predetermined one of its positions, and whereby upon the removal of the handle the said operating-head may be locked in such position by the second locking-pin.

Signed by me at New York, N. Y., this 23d day of March, 1900.

JOSEPH E. NORMAND.

Witnesses:
 C. F. CARRINGTON,
 HUGH YOUNG.